May 10, 1938.  H. W. LANGBEIN  2,117,027
BRAKE INDICATING AND TESTING DEVICE
Filed Dec. 9, 1935
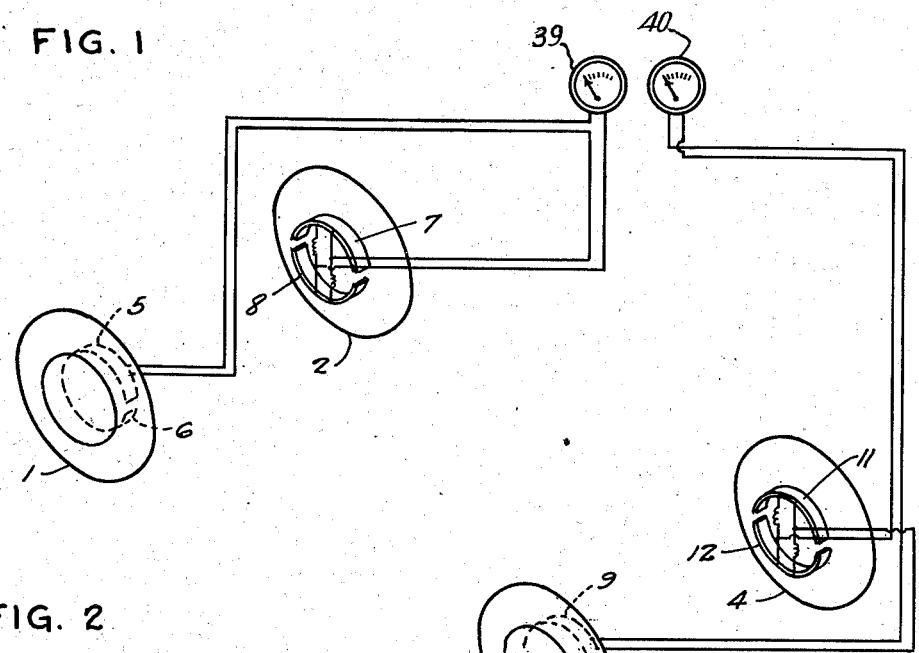
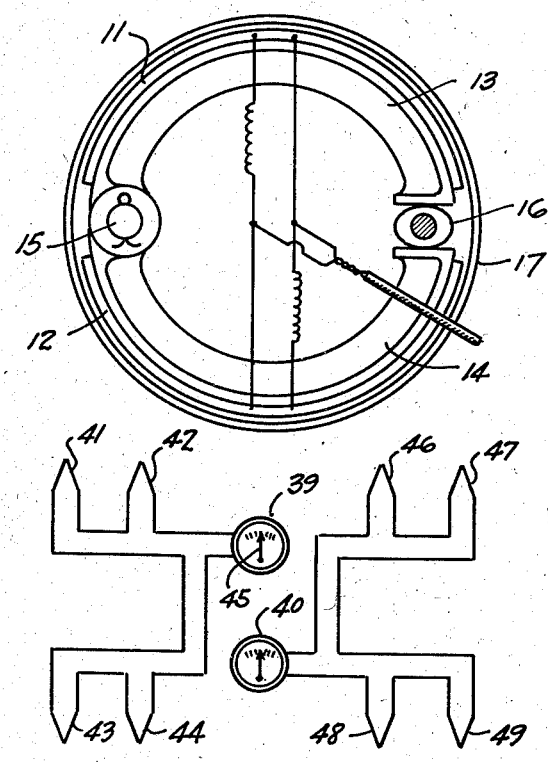
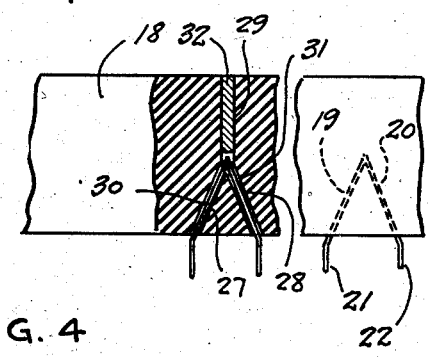
INVENTOR
Harold W. Langbein
BY John F Lam
ATTORNEY Patented May 10, 1938

2,117,027

UNITED STATES PATENT OFFICE 2,117,027

BRAKE INDICATING AND TESTING DEVICE

Harold W. Langbein, Los Angeles, Calif.

Application December 9, 1935, Serial No. 53,587

3 Claims. (Cl. 73—341)

This invention relates to a device for indicating the condition of brakes on an automobile.

Brakes are now commonly applied to both the front and rear wheels of automotive vehicles. It is of course well understood that substantial equalization of the braking effect of each of the front wheels is important, not only to obtain the maximum deceleration, but also to prevent any tendency of the vehicle to pull to one side. For similar reasons, the rear brakes should also be equalized. To facilitate brake adjustment, indications of the braking effect are essential.

It has been proposed in the past for guidance in making brake adjustments, to test the braking effect by mechanical means; but in the main, the contrivances attempting to accomplish this are not only expensive to install, but have been found so unreliable that often only road tests are used to ascertain the condition of the brakes. Nor has it been possible for the driver of the vehicle, during operation, to check his own brakes except by comparatively crude road tests.

That frequent checking of the brakes for possible adjustment by the car operator is advisable can be readily appreciated when it is considered that there are several causes for disturbing the brake equalization, which causes can neither be readily anticipated nor avoided. For example, even when hydraulic pressure brakes are used, the pressure exerted may not be uniform at all brakes because of possible differences in the various conduits, or even accumulation of foreign matter on the brake surfaces. Again, inadvertent accumulation of grease or oil on the brake lining may produce harmful effects; and uneven wear of the lining itself may cause loss of equalization.

It is one of the objects of this invention to make it possible to keep a constant check on the brakes even during normal operation of the vehicle, as by the aid of indicating instruments which may be mounted on the dash board of the vehicle. The indications can be used not only to check the equalization of the brakes, but also the intensity of braking effect or the occurrence of grabbing, but also to indicate a dragging brake.

In order to secure these results, it is intended to utilize a basic effect due to the application of brakes. Brakes of course are used to convert kinetic energy into heat; the more the deceleration effect therefore, the greater the conversion from one form of energy into another. This heating is dissipated through the brake lining and its associated mechanism. Therefore it is clear that the intensity of the braking effect of each brake can be ascertained by determining the temperature attained at the brake; and a comparison of these temperatures can be used to indicate equality or inequality between the brakes. The rate of conversion into heat may be taken as an indication as to whether the brake grabs.

It is accordingly another object of this invention to utilize the temperature effect at the brakes for indicating the braking conditions—such as comparative braking effects, or whether a brake is dragging, or grabbing.

The necessity of simplicity in the gauging and indication of relative temperatures precludes the use of the commoner forms of thermometers. Instead, a thermocouple effect can be used, so that the electromotive force in a circuit is made to vary as a function of the temperature. Such an arrangement is admirably suited for dash board display, as merely a few wires need be led to the thermocouples that are associated with the brakes. It is accordingly still another object of this invention to utilize the thermocouple effect for brake testing.

The brake lining provides a friction surface where the heat is generated. Therefore a convenient location for the thermocouples is right in or at the brake lining, as by being embedded therein during the process of manufacture. It is still another object of this invention to provide a brake lining of this character.

In actual operation, each brake may be provided with one or more thermocouples distributed along the length of the brake band. The thermoelectric current can be utilized to actuate a millivoltmeter placed conveniently on the dash board. Thus for four wheel brakes, each wheel can have a corresponding instrument; or, as hereinafter explained, one instrument can be used for both the front wheels, and another for both the rear wheels. A deflection of the instrument needle in one or the other direction then serves to indicate whether the right or left wheel has a greater braking effect than the other of the pair of wheels.

The brake indicator utilizing the temperature effects as referred to hereinbefore can be incorporated in testing equipment in place of being permanently installed on the vehicle.

This invention possesses many other advantages, and has other objects which may be made more easily apparent from a consideration of an embodiment of the invention. For this purpose there is shown one form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing:

Figure 1 is a diagram illustrating a system incorporating the invention;

Fig. 2 is a side view of one of the brake mechanisms incorporating the invention;

Fig. 3 is a diagram illustrating how the temperature responsive elements can be incorporated within the brake lining; and Fig. 4 is a wiring diagram of the system.

In Fig. 1 the front wheels 1 and 2 as well as the rear wheels 3 and 4 are shown diagrammatically as they might be arranged for an automotive vehicle. Associated with wheel 1 are the brake linings 5 and 6. Similarly, brake linings 7 and 8 are shown in connection with wheel 2; brake linings 9 and 10 are shown associated with wheel 3; and brake linings 11 and 12 are shown as associated with wheel 4.

The brake mechanism is diagrammatically indicated in Fig. 2 in connection with wheel 4. The particular construction of the brake mechanism is not involved in the present invention, as the brake mechanism could be mechanical or hydraulic and can be internally expanding or externally contracting. In the present instance, the brake shoes 13 and 14 are shown as hinged at 15 and operated to expand as by a cam 16. The brake drum 17 is shown as encompassing the brake lining segments 11 and 12.

In order to gauge the intensity of the braking effect of each wheel for purposes of comparison or for purposes of measuring, one or more temperature responsive devices can be associated with each of the brake linings 5, 6, 7, 8, 9, 10, 11 and 12. These temperature responsive devices are intended to be in good heat conducting relationship to the braking surfaces, between the brake linings and the drums such as 17.

For this purpose, use is made of one or more thermocouples embedded in each brake lining segment. The thermocouples are more clearly indicated in Fig. 3, showing a section of brake lining arranged in accordance with this invention. Thus as shown at the right hand portion of the figure, the brake lining 18 can have mounted therein the thermocouple including the wires 19 and 20. Wires 19 and 20 can form a thermocouple pair; for example, one can be of iron and the other of an alloy of copper. The leads 21 and 22 can extend in any convenient manner from the elements 19 and 20. Since brake lining is now generally made from moulded material, it is a simple matter to embed the thermocouple elements 19 and 20 within the body of the brake lining during the moulding operation. The wires forming the elements 19 and 20 can be of the order of #30 wire. It is well understood that when the joint between the elements 19 and 20 is heated, a thermocouple current can flow in a closed circuit, the current being a function of the temperature reached.

One or more thermoelectric couples can be distributed around each segment 11 and connected in series or parallel relation, and the entire set of thermoelectric couples associated with one brake drum can be connected in series or parallel relation. They can then be connected in appropriate circuits with indicating instruments, such as millivoltmeters 39 and 40. By distributing the thermocouples along the brake segments, the response of the instruments will be in accordance with the average heating created at the respective braking surfaces.

The instruments 39 and 40 can be installed directly on the dash board of the vehicle; or else they may form a separate installation in a brake testing station.

Furthermore, in order to install thermoelectric couples in existing braking linings, the thermoelectric wires can be installed in a manner indicated in the left portion of Fig. 3. In this figure it is seen that the slanting apertures 27 and 28 can be drilled from the edge of the brake lining 18 to meet at about the center of the width of the brake lining. A straight aperture 29 can be drilled from the opposite edge to meet the two slanting apertures. Then the wires 30 and 31 forming the thermocouple can be pushed through their respective apertures 27 and 28 as well as through the aperture 29 to be joined beyond the top edge as by soldering or by welding. Then the thermoelectric couple thus formed can be pulled downwardly into the position shown in Fig. 3; and aperture 29 can be filled with a wire 32 of good heat conducting material, such as copper.

The indications during running of the vehicle with the brakes off should of course be zero. If any one of the brakes drag, this will be immediately apparent by the deflection of the corresponding instrument pointer.

It is, of course, unnecessary to indicate individual temperatures attained in each brake; but rather a comparison of the temperatures attained at each pair of front and rear brakes is all that is necessary. Accordingly, as shown in Fig. 4, one of the indicating instruments, for example, 39 can be associated with the front wheels and the other instrument, 40, with the rear wheels. The thermoelectric couples 41 and 42 may cooperate with the right front wheel and the thermoelectric couples 43 and 44 may cooperate with the left front wheel of the vehicle. The connections of the thermocouples are such that the electromotive forces generated in thermoelectric couples 43 and 44 oppose the electromotive forces generated in thermoelectric couples 41 and 42. Accordingly, the instrument 39 measures the difference in the temperature effects attained at the two brakes and can be so arranged that the pointer 45 deflects to the right when the right front wheel has the greater braking effect; and conversely it deflects to the left when the left front wheel has the greater braking effect.

A similar arrangement is provided in connection with the rear wheels, the thermoelectric couples 46 and 47 being associated with the right rear wheel and thermoelectric couples 48 and 49 with the left rear wheel. The instrument 40 is utilized to indicate which of the two wheels has the greater braking effect.

It is apparent that inequality in the braking effect not only during continuous braking operation, but also during the very instant of brake application, can be ascertained by watching the deflection of the instrument pointers.

I claim:

1. A brake lining for vehicles, there being at least one pair of holes formed therein extending inwardly from one edge of the lining and converging to meet at a point substantially equidistant from the edges of the lining, there being a hole from the opposite edge of the lining to said meeting point, a thermo-couple having a conductor thereof disposed respectively in each of the two converging holes with its hot junction substantially at the point of meeting, and means to close the other hole.

2. In a device for indicating brake equalization for a pair of brakes on a vehicle, a thermo-couple associated with each brake, said thermo-couples being in a common series circuit and connected in opposing relationship, and an indicator in circuit with the thermo-couples to indicate the direction and magnitude of the current flowing in said circuit, thereby giving a comparison between the temperatures existing at the brakes due to a brake application.

3. In a vehicle having a plurality of wheel brakes, means for comparing the braking effects of the individual wheel brakes comprising a thermo-couple so disposed as to be affected by heat generated by each brake in braking, the thermo-couples for the brakes associated with each pair of wheels being in a common series circuit and connected in opposing relationship, and forming a set, an indicator in circuit with each set of thermo-couples to indicate the direction and magnitude of the current flowing in each of said circuits, thereby giving a comparison between the braking effect existing at each wheel.

HAROLD W. LANGBEIN.